SUPERCONDUCTIVE CIRCUIT AND METHOD FOR MEASURING MAGNETIC FIELDS AND MAGNETIC PROPERTIES OF MATERIALS EMPLOYING SERIALLY CONNECTED SUPERCONDUCTIVE LOOPS

Filed Sept. 3, 1963

MORRIS BOL
BASCOM S. DEAVER, JR.
WILLIAM M. FAIRBANK
INVENTORS

BY Flehr Hohbach & Swain

ATTORNEYS

July 8, 1969 M. BOL ET AL 3,454,875

SUPERCONDUCTIVE CIRCUIT AND METHOD FOR MEASURING MAGNETIC FIELDS AND MAGNETIC PROPERTIES OF MATERIALS EMPLOYING SERIALLY CONNECTED SUPERCONDUCTIVE LOOPS

Filed Sept. 3, 1963

MORRIS BOL
BASCOM S. DEAVER, JR.
WILLIAM M. FAIRBANK
INVENTORS

BY Flehr & Swain

ATTORNEYS

MORRIS BOL
BASCOM S. DEAVER, JR.
WILLIAM M. FAIRBANK
INVENTORS

BY Flehr and Swain
ATTORNEYS

July 8, 1969 M. BOL ET AL 3,454,875

SUPERCONDUCTIVE CIRCUIT AND METHOD FOR MEASURING MAGNETIC FIELDS AND MAGNETIC PROPERTIES OF MATERIALS EMPLOYING SERIALLY CONNECTED SUPERCONDUCTIVE LOOPS

Filed Sept. 3, 1963

MORRIS BOL
BASCOM S. DEAVER, JR.
WILLIAM M. FAIRBANK
INVENTORS

BY [signature]

ATTORNEYS 3,454,875

SUPERCONDUCTIVE CIRCUIT AND METHOD FOR MEASURING MAGNETIC FIELDS AND MAGNETIC PROPERTIES OF MATERIALS EMPLOYING SERIALLY CONNECTED SUPERCONDUCTIVE LOOPS

Morris Bol, 925 Roble Ridge, Palo Alto, Calif. 94306; Bascom S. Deaver, Jr., 3909 Louis Road, Palo Alto, Calif. 94303; and William M. Fairbank, 141 E. Floresta Way, Menlo Park, Calif. 94025

Filed Sept. 3, 1963, Ser. No. 306,252
Int. Cl. G01r *33/02;* G11b *9/00*
U.S. Cl. 324—47 29 Claims This invention relates generally to a superconductive measuring circuit and method, and more particularly to a superconductive measuring circuit for measuring extremely small magnetic fields and magnetic susceptibility.

Magnetic fields and magnetic moments have been measured by providing relative movement between a material whose field is to be measured and a pickup coil. The E.M.F. induced in the pickup coil may be amplified and applied to suitable indicating means. Magnetic fields have also been measured by their effect on electrons or nuclear energy levels. These effects can be measured by electron resonance measurements or by optical pumping. Magnetic fields and/or susceptibility can also be measured by measuring changes in mutual or self-inductance in a coil surrounding the material by applying an A.C. signal to the material.

The optical pumping method can be made very sensitive and capable of detecting magnetic fields as small as $10^{-10}$ gauss. Other methods are considerably less sensitive. The most sensitive electron resonance system can measure susceptibility due to $10^{10}$ electron spins. There is, however, a need for accurately measuring even smaller magnetic fields and susceptibility. For example, extremely small magnetic flux must be measured when conducting quantized flux experiments; further to measure the susceptibility and magnetic fields in organic and biological samples such as DNA; and in detecting electron resonance absorption of microwave energy, among others. There are, of course, many other applications which need not be mentioned since a description of the present system will suggest many other applications for the measuring system.

In order to simplify understanding of the present invention, a brief description of several phenomena which occur at cryogenic temperatures are described. At these temperatures, a superconductor exhibits zero resistance to direct currents. If a singly connected ideal superconductor is placed in a magnetic field and then cooled so as to become superconducting, the magnetic flux lines are completely repulsed from within the superconductor. Thus, the flux inside a superconductor becomes zero regardless of its initial conditions, providing, of course, that a critical field for the particular operating temperature is not exceeded. This effect is often referred to as the Meissner effect.

When a superconductor is in the shape of a ring, such as a wire formed into a loop or circle, interesting properties are developed. Once started, a current in the ring will continue to flow indefinitely so long as the temperature and applied field remain unchanged. This is due to the fact that the decay time of the current is governed by the inductance-resistance ratio which is infinite when the resistance is zero. If an external magnetic field H is applied perpendicular to the plane of the ring after it is made superconductive, currents will be induced in the ring so as to keep the magnetic flux inside the ring equal to zero. It was recently discovered by two of the inventors, Deaver and Fairbank and independently by Doll and Näbauer, that flux in a superconducting ring is quantized in integral units of $hc/2e=2\times10^{-7}$ gauss centimeter$^2$. In a superconducting coil of N turns, the quantized unit of flux is reduced by 1/N. If the superconducting ring is placed in a magnetic field and then cooled below the critical temperatures, a current will flow just sufficient to shift the flux through the ring to the nearest integral number of flux units. If the field is then removed, a circulating current will build up in the ring so that the flux inside the ring remains constant at this value.

It is a general object of the present invention to provide an extremely sensitive superconductive measuring circuit capable of measuring small magnetic flux, magnetic fields, magnetic moments and magnetic susceptibilities.

It is a further object of the present invention to provide a superconductive measuring circuit and method in which the magnetic properties of material can be measured without movement of the material or the pickup coil.

It is a further object of the present invention to provide a superconductive measuring system and method employing serially connected superconductive loops arranged so that one detects magnetic fields in a material sample and the other is employed to modulate the persistent currents in the loop so that the changes in current can be electromagnetically detected.

It is a further object of the present invention to provide a superconductive measuring circuit and method in which a pair of serially connected loops are arranged so that one loop detects the magnetic fields of a sample and means associated in conjunction with the other loop for modulating the persistent current in the loop, together with pickup means for detecting changes in current and applying the same to associated electronic equipment for measuring the changes in current.

It is another object of the present invention to provide a superconductive measuring system and method making use of persistent currents in a superconductive loop for determining the magnetic properties of material.

It is a further object of the present invention to provide a superconductive measuring system and method for measuring changes in magnetic flux.

It is another object of the present invention to provide a superconductive system and method capable of measuring magnetic fields and/or susceptibility of sample material disposed within a superconducting shield arranged to shield the sample from external fields.

It is another object of the present invention to provide a superconductive measuring circuit and method in which the sample material may be placed in a superconductive coil or loop exposed to a high magnetic field while the modulating coil is disposed at another location shielded from the fields whereby it is exposed to a zero or predetermined different field.

The foregoing and other objects of the invention will become more clearly apparent from the following description when taken in conjunction with the accompanying drawing.

Referring to the drawing:

FIGURE 1 schematically illustrates a circuit in accordance with the present invention;

Figure 15:
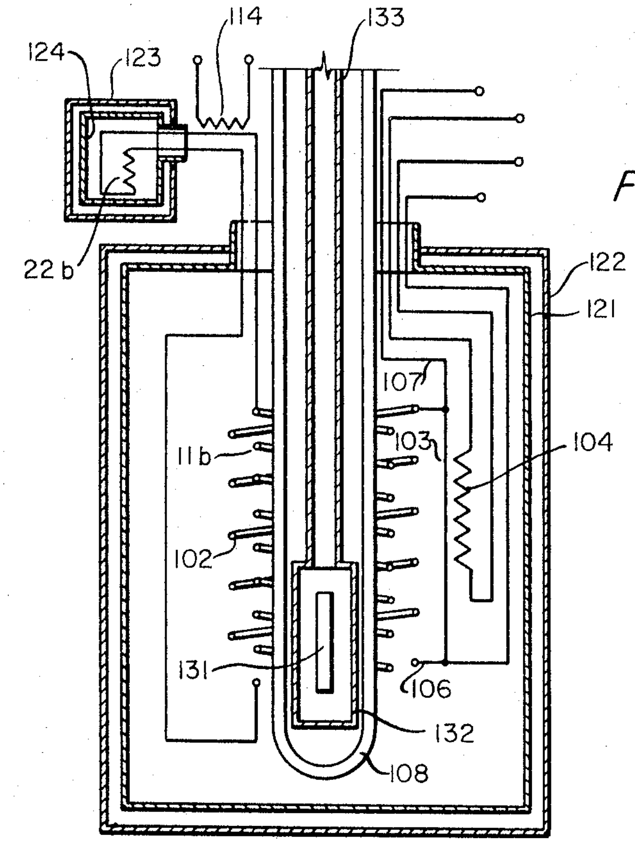
Figures 12, 13, 14:
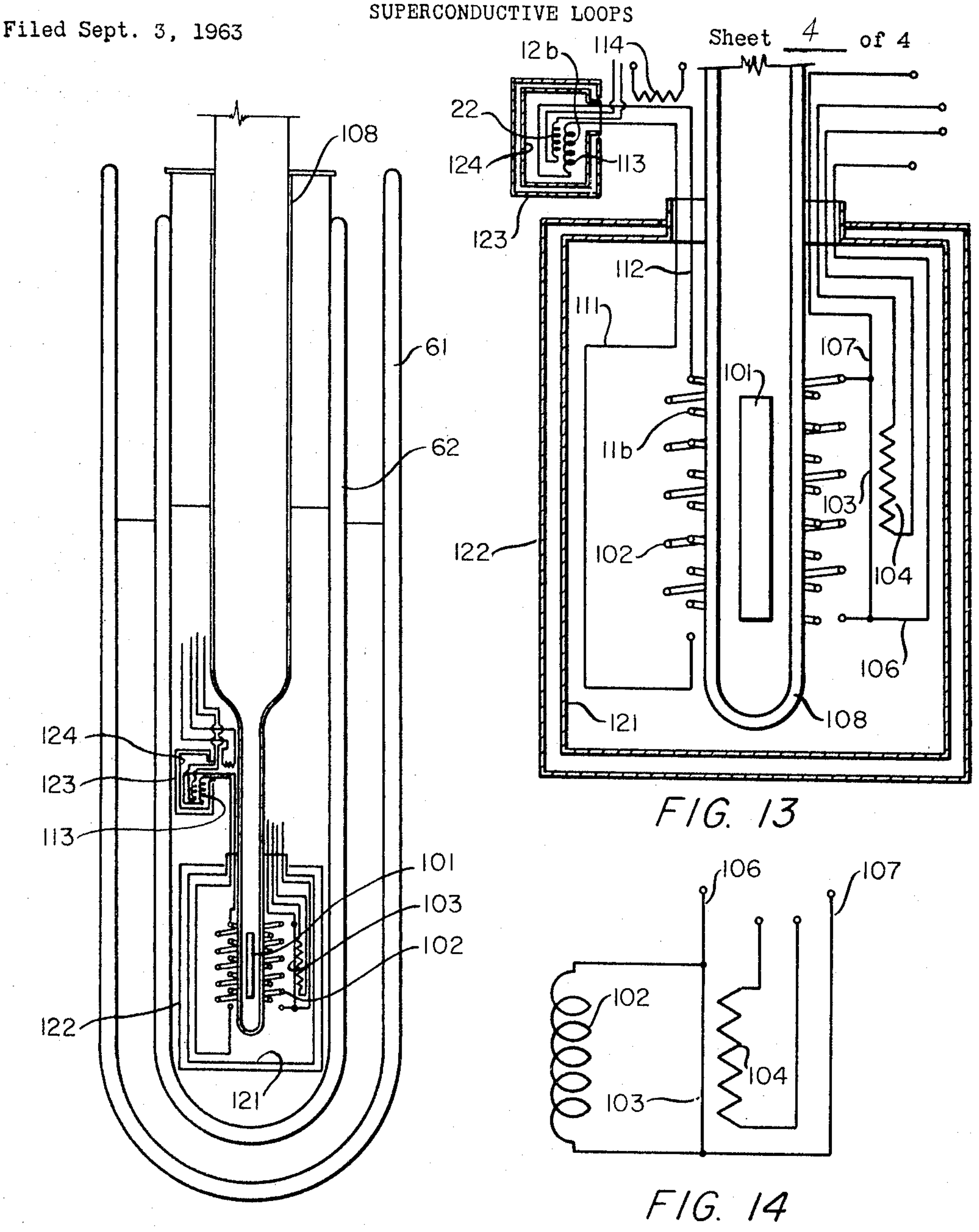
FIGURE 12 shows a system in which there is provided a superconducting magnet for applying high magnetic fields to a test sample.
FIGURE 13 is an enlarged view of the lower portion of FIGURE 12.

FIGURE 14 schematically illustrates the superconducting magnet of FIGURES 12 and 13; and FIGURE 15 is an enlarged view of the system shown in FIGURE 12 incorporating means adapted to carry out electron or nuclear magnetization measurements.

Figure 1:
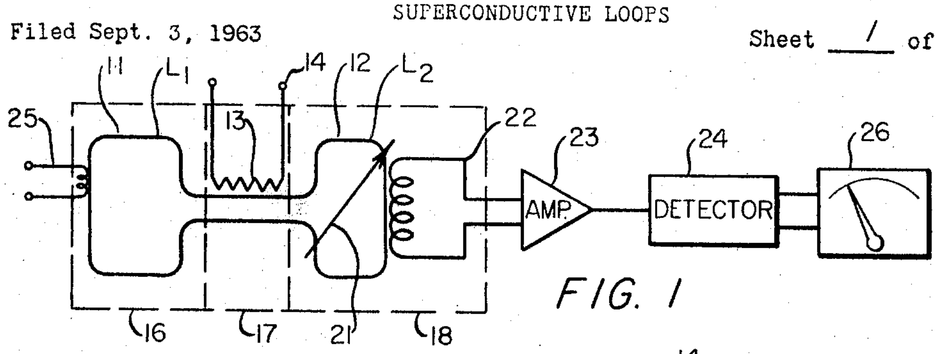

The system of the present invention is schematically illustrated in FIGURE 1. The system employs two serially connected superconducting loops 11 and 12. The loops are indicated as having the inductance $L_1$ and $L_2$, respectively. It will become apparent that the loops 11 and 12 may comprise a single turn of wire, or they may comprise multiple turns whereby to form a loop. Disposed between the coils and closely adjacent to the conductor is a resistance heater 13 adapted to be connected to a suitable source of power at the terminals 14. The heater 13 is employed to heat a limited region of wire to stop or extinguish any persistent current flowing in the series circuit. Preferably, the coils 11, 12 and the heater 13 are isolated one from the other by superconducting shields indicated by the dotted lines 16, 17 and 18. As is well known, these superconductive shields merely consist of material which is maintained at cryogenic temperatures so that they are superconducting. A shield of this type will then serve to maintain constant the fields passing therethrough in accordance with the well-known phenomena described above. Conductive leads passing through the shields are accommodated in tubes, in accordance with well-known practice, whereby to exclude from the interior of the shell any change in the external magnetic field.

With all of the various elements described exposed to cryogenic temperatures, the resistance of all the elements becomes zero and the magnetic fields will be constant. Any change in flux through one of the coils 11 or 12 will cause persistent current to flow in the series circuit such that the flux generated in the two coils 11 and 12 cancels the flux change.

Assuming that a flux $\phi_o$ is introduced in the coil $L_1$, then the current generated in the circuit is given by the expression $$N_1\phi_o=(L_1+L_2)i \quad (1)$$

where $N_1$ equals the number of turns in coil 11; $L_1$ no $L_2$ the inductance of the coils 11 and 12; and $i$ the persistent current generated.

Since the current $i$ is common to both $L_1$ and $L_2$, it follows that $$N_1\phi_1=L_1i \text{ and} \quad (2)$$
$$N_2\phi_2=L_2i \quad (3)$$

where $N_2$ equals the number of turns in coil 12, and $\phi_1$ and $\phi_2$ are the fluxes produced by the current $i$.

Substituting Equations 2 and 3 into Equation 1 gives $$N_1\phi_0=N_1\phi_1+N_2\phi_2 \quad (4)$$

the relationship between the applied flux and the fluxes generated in the two coils.

Since in Equation 1, $N_1\phi_o$ is constant, a change in $L_2$ produces a change in $i$ and thus a change in the ratio of the flux in Equation 4; in fact, if $L_2$ is made zero, Equation 4 becomes $$N_1\phi_o=N_1\phi_1$$

or all the flux appears in coil $L_1$. If a pickup coil is placed around $L_1$ or $L_2$, the change in flux will generate an E.M.F. which can be detected. If $L_2$ is varied periodically, a periodic change in current takes place and a periodic change in E.M.F. is produced.

In FIGURE 1, the variation of the inductance is schematically illustrated by the arrow 21. The pickup coil 22 has its output applied to an amplifier 23 which may include a preamplifier and a tuned amplifier tuned to the modulation frequency. The output of the amplifier may be applied to a detector 24 which serves to detect the amplified alternating current signal and form a D-C current which can be applied to a suitable meter 26. Of course, it is apparent that other types of electronic circuitry can be substituted for the elements 23, 24 and 26 to measure the induced voltages in the coil 22.

Operation of the circuit of FIGURE 1 to measure a magntic field is substantially as follows. First, the heater 13 is energized to heat the adjacent conductor to thereby normalize a portion of the superconductive loop to interrupt any persistent current. The heat is then turned off. The only current flowing in the superconducting circuit is current necessary to make the total flux through $L_1+L_2$ equal to the nearest quantized value. This can be made small by making $N_1+N_2$ large and is made zero by applying a trim field to either $L_1$ or $L_2$ to bring current to zero. The trim field can be introduced by applying current to a trim coil 25 coupled to the coil 11. If the magnetic field to be measured is now coupled to the loop $L_1$, a current will flow in the superconductive loop to maintain the flux constant at its initial value. The magnetic field to be measured may be from a sample of material and introduced by inserting the sample into the coil; it may be introduced by directing the magnetic field to be measured through the loop; or it may be induced, as will be presently described, by varying the magnetization of the sample by applying electromagnetic radiatio at appropriate resonance frequency, for example, electron or nuclear resonant spin-frequency or by other changes, i.e., temperature. The above experiment on a magnetic material can be done in the presence of an applied field from, i.e., a superconducting magnet, and only the changes in flux will be observed. The persistent current which is generated by the additional flux will be proportional to the additional flux. In other words, the $N_1\phi$ will equal $i(L_1+L_2)$. Now if the inductance $L_2$ is periodically varied, it will cause decrease and increase in persistent current. This decrease and increase in current will generate a periodic flux change which induces a periodic E.M.F. in the coil 22. This can then be amplified, detected and measured. The amount of flux change and thus the amplitude of the induced E.M.F. is dependent upon the change in inductance $\Delta L$. However, once the change has been established and the system calibrated, the exact magnitude of the flux introduced as reflected in persistent current can be measured. An alternate method of measuring the value of the flux introduced is to reduce the persistent current to zero by introducing a known flux from an auxiliary trim coil, such as coil 25, into $L_1$ or $L_2$, thereby causing a zero signal in the output of the amplifier. This null method has the usual advantage of eliminating the effects of drifts in the gain of the amplifier or other parts of the system. This alternate method provides a null detection system.

It is to be observed that the change in persistent current is directly proportional to the change in flux caused by the sample. Where the initial persistent current has been adjusted to zero before the magnetic field to measure is introduced, the total value of the persistent current is representative of the flux; whereas, when there is an initial persistent current present, the change in persistent current is proportional to the flux being measured.

The small current which flows when the loop is made superconductive in the presence of a field can be used to measure the difference between the flux encircled by the loop $L_1$ and $L_2$ and the nearest quantized value. If the flux encircled is less than one-half the flux unit, this current is an absolute measurement of the flux inside the loop without requiring any relative motion of coil and field.

It is further observed with reference to FIGURE 1 that the measuring coill 11 is magnetically isolated from the modulating coil 12 by the superconducting shields 16 and 18. Further, both the measuring and modulating loops are, in turn, magnetically isolated from the heater by the superconducting shield 17.

Figure 2:
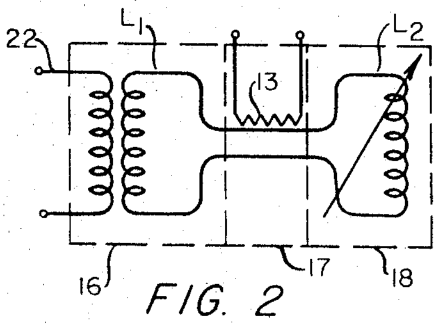
FIGURE 2 shows another circuit incorporating the principles of FIGURE 1.

Referring to FIGURE 2, there is shown a system similar to that of FIGURE 1. Like reference numbers are applied to like parts. In the system of FIGURE 2, however, the pickup coil 22 is arranged adjacent the measuring loop or coil 11 to generate an E.M.F. proportional to changes in flux therein rather than adjacent the modulating loop or coil 12. In other respects, the system operates in a manner identical to that described above.

Figure 3:
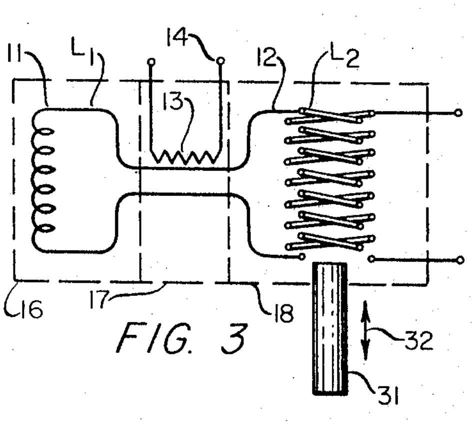
FIGURE 3 shows a circuit similar to that of FIGURE 1 including movable means associated with one loop or coil for modulating the persistent currents.

Referring now to FIGURE 3, there is shown a system similar to that of FIGURE 1 with like reference numerals again applied to like parts. The system of FIGURE 3 includes a movable superconducting rod 31 for modulating the inductance $L_2$ of the loop 12. As described above, the flux inside an ideal superconducting rod is zero. Thus, if a superconducting rod is periodically moved into coupled relationship with the coil 12, it will exclude fields from the coil and lower its inductance $L_2$, and reduce the inductance to zero if it is tightly coupled thereto.

Figure 4:
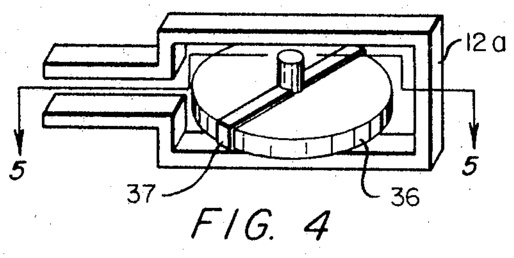
FIGURE 4 is a perspective view of a loop and another inductance modulating means.
Figure 5A:
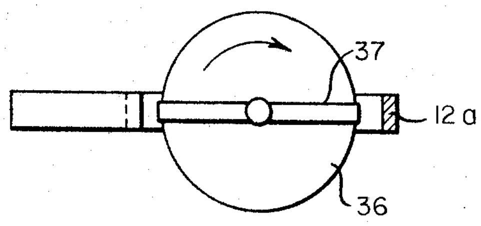
FIGURES 5A and 5B are sectional views taken along the line 5—5 of FIGURE 4 and showing the modulating means in two positions.
Figure 5B:
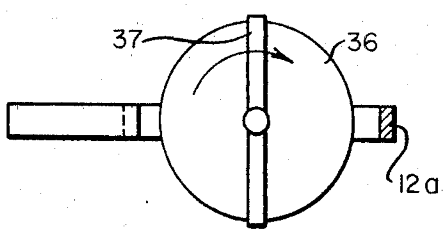

A periodic motion of the rod 31 will serve to modulate the current $i$ flowing in the loop and thus to provide a modulated flux which can be picked up at either the coil 11 or coil 12, as shown in FIGURES 1 and 2, to give an indication of the persistent current in the loop. The superconducting rod 31 may, for example, be mechanically connected to the moving element of a loudspeaker which is excited at a relatively high frequency. Output E.M.F.'s frequencies in the order of 20,000 cycles or more may be generated.

Where it is desirable to obtain higher frequencies, the modulating coil **12*a* may be relatively slender, such as shown in perspective in FIGURE 4, to surround a disc 36. The disc can be driven by an electric motor or by a turbine to rotate at very high angular velocities. The disc 36 is formed with one or more superconducting bands 37 which extend entirely around the same. When the bands are in the position such as shown in FIGURE 5A, the superconductive band is in coupled relationship with the coil and all fields will be excluded from the coil 12*a*. The inductance is increased and the current decreased when the coil is in the position shown in FIGURE 5B; the coil 12*a*** will have its maximum flux and the persistent current will be minimum. There may be a large number of these bands arranged in spaced radial relationship whereby the frequency of modulation may be made many times the angular velocity of the disc. In the embodiment of FIGURE 4, it is possible to obtain much higher modulating frequencies.

Figure 6:
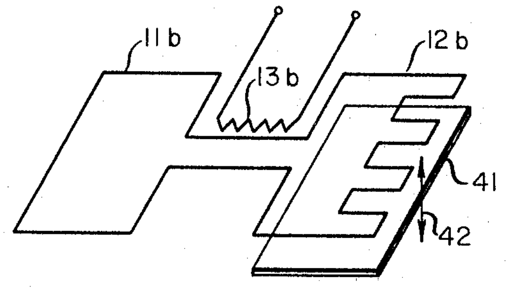
FIGURE 6 shows a system in accordance with the invention employing a movable ground plane for modulating the inductance of the modulated loop or coil to modulate the persistent current.

The inductance of the modulating coil may be varied by varying the spacing between the coil and an adjacent ground plane. Referring to FIGURE 6, there is shown a modulating coil **12*b* with the conductor in zig-zag form to increase its length $l$. Spaced closely adjacent to the coil is a superconducting ground plane 41 which is movable with respect to the coil as indicated by the arrow 42**. The inductance is proportional to $$lt/W$$

where $l$=length of coil adjacent to the ground plane; $t$=spacing between coil and ground plane, and W=width of the wire; $W \gg t$ and $l \gg W$.

Thus, by closely spacing the superconducting ground plane 41 adjacent the loop **12*b* and moving the plane so that the distance $t$ is varied, large changes in inductance may be introduced in the coil 12*b***.

Figure 7A:
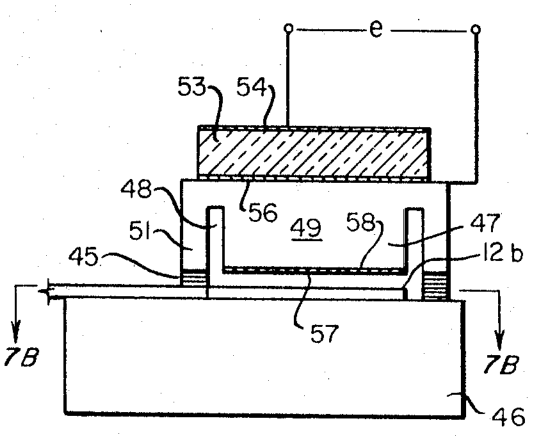
FIGURE 7A is a side elevational view, partly in section, of the system in FIGURE 6 showing one manner of moving the ground plane.
Figure 7B:
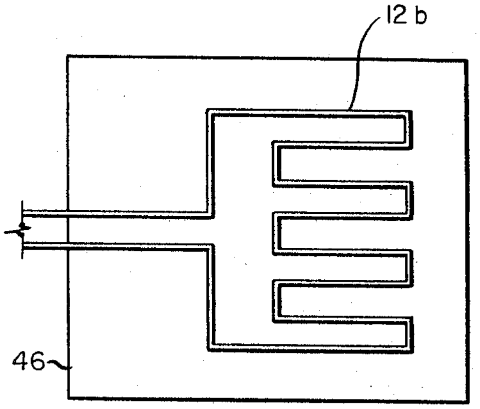
FIGURE 7B is a view taken along the line 7B—7B of FIGURE 7A.

To achieve this at relatively high frequencies, the ground plane can be mouned on a piezoelectric crystal which is electrically excited. Such an assembly is shown in FIGURES 7A and 7B. A supporting block 46 has formed thereon in the form of a film or flat conductors the coil **12*b* forming a part of the superconductive loop. A quartz crystal 47 is formed with a cylindrical groove 48 to define a center protuberance 49 and side edges 51. The side edges 51 are employed to support the crystal adjacent the superconducting coil 12*b*. Shims or spacers 45 may be employed between the edges and the support 46. The quartz crystal may be placed in resonance by mechanically coupling it to a piezoelectric crystal 53 having spaced contacts 54 and 56 for exciting the same. Application of electric fields to the crystal 53 will cause it to mechanically resonate and the mechanical resonance is transmitted to crystal 47 which will be placed in mechanical resonance. The center portion of quartz crystal 47 can itself serve as a piezoelectric crystal. If a ground plane 57 is secured to the face 58**, it will be moved with respect to the coil and vary the distance $t$, and thus the inductance. In a system of this type, relatively high modulating frequencies in the order of megacycles or more can be achieved.

Figure 8:
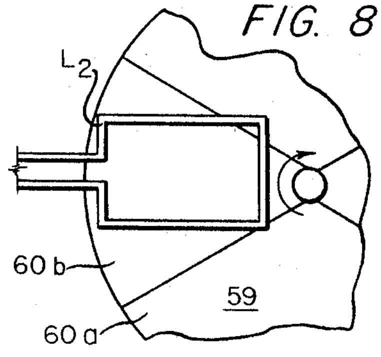
FIGURE 8 is a plan view showing another method of moving a ground plane.

Another way of varying the position of a ground plane and therefore the inductance of $L_2$ is to rotate a disc 59 with alternate normal and superconducting regions **60*a* and 60*b***, respectively which is disposed adjacent the loop or coil, such as shown in FIGURE 8.

Figure 9:
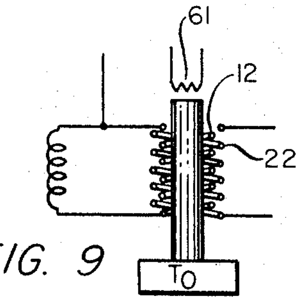
FIGURE 9 shows another method of modulating the inductance to modulate the persistent current.

In FIGURE 9, there is shown another method of modulating the inductance of the modulating coil. A super conducting post has wound thereon the modulating coil 12 and pickup coil 22 in the manner previously described. One end of the post is connected to a temperature $T_0$ well below the transition temperature for the material forming the post, while the other end of the post has a heater 61 disposed adjacent thereto. If the heater is periodically energized, the post may be heated above its transition temperature to cause it to periodically go into its normalized state. This modulates the inductance of the loop 12 and thus the flux in the pickup coil 12 in the manner previously described.

It is thus seen that there has been described a variety of ways in which the inductance of the modulating loop may be varied to give the desired modulation of the persistent current to permit measurement of the same.

The sensitivity of the system is dependent, of course, upon the amount of power which can be obtained, the limit being when the power is near the noise figure.

The sensitivity for measuring small magnetic fields can be calculated as follows:

Magnetic energy is given by the expression $$\tfrac{1}{2}LI^2=\frac{N_1^2\phi_1^2}{2L_1}+\frac{N_2^2\phi_2^2}{2L_2} \qquad (5)$$

where $L=L_1+L_2$ and the other symbols are as previously defined.

The power generated by modulating the inductance is given by $$\left(\frac{\Delta L}{L}\right)^2 \tfrac{1}{2}(LI^2)f \qquad (6)$$

where $f$ is the modulation frequency and $\Delta L$ the change in total inductance.

The noise signal in an amplifier is $$kT\Delta f$$

where $k$=Boltzmann's constant; T is the noise temperature in degrees Kelvin; and $\Delta f$ the bandwidth.

Assuming that one-half the available power is transmitted to the pickup coil and that only signals equal to or greater than the noise can be measured, the minimum field is given by equating the noise power to one-half the signal power and assuming $L_1=L_2$, $N_1=N_2=1$ $$\phi^2=32kT\frac{\Delta f}{f}L_1\left(\frac{L_1}{\Delta L}\right)^2$$

If the loop has an inductance of $5\times10^2$ abhenries (a loop 11.3 cm. in diameter and 100 cm.$^2$ in area) and if $T=4°k$, $\Delta f/f=10^{-9}$ and $L_1/\Delta L=10$ $$\phi=9\times10^{-10}\text{ gauss cm.}^2 \quad (8)$$

$$H=\phi/A=9\times10^{-12}\text{ gauss cm.}^2 \quad (9)$$

Figure 10:
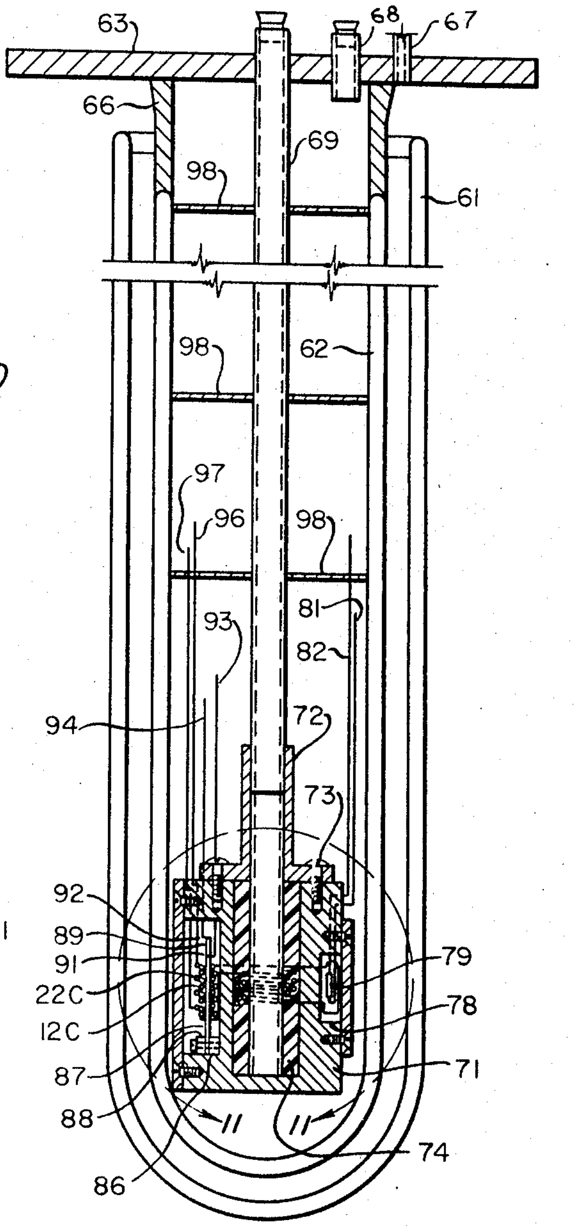
FIGURE 10 is an elevational view in section showing apparatus incorporating the invention.
Figure 11:
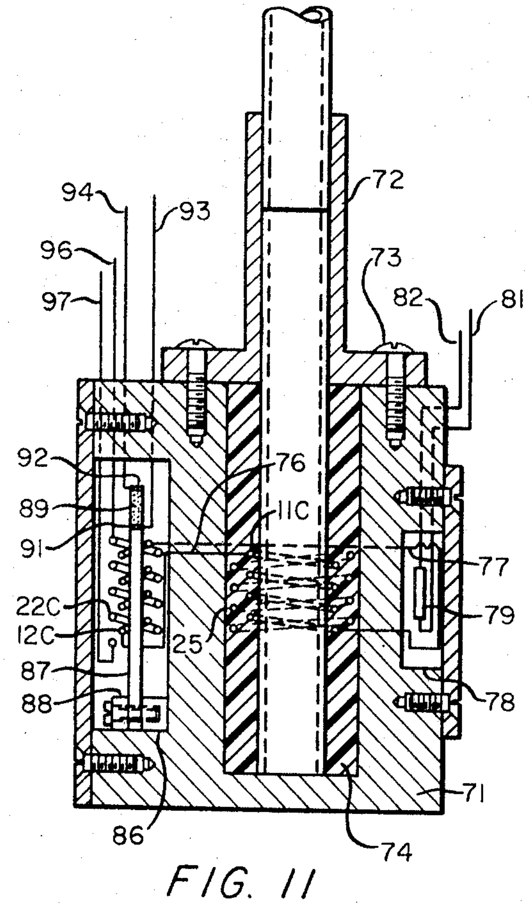
FIGURE 11 is an enlarged view of the lower portion of the apparatus shown in FIGURE 10 taken generally along the line 11—11 of FIGURE 10.

Referring to FIGURES 10 and 11, there is shown apparatus employing the modulator described above with reference to FIGURE 9. The apparatus includes a first Dewar flask 61 and a second coaxially disposed Dewar flask 62. The annular space between the Dewar flasks 61 and 62 serves to retain liquid nitrogen, while the Dewar flask 62 contains within the same the helium liquid for lowering the temperatures to below the critical temperature for the metals being employed in the superconducting loop. The annular space may be filled through a filling tube 67 while the flask 62 may be filled through the filling tube 68.

Extending coaxially downwardly within the Dewar flask 62 is a hollow post 69 having its upper end passing through and secured to the plate 63. The lower end of the post serves to support the various coils and heaters associated with the system. Furthermore, the post provides means whereby a sample may be inserted downwardly and in cooperative relationship with the measuring or detecting coil.

A block 71 having a cylindrical socket is secured to a flange 72 carried by the tube 69 by means of screws 73. A nylon sleeve 74 is disposed in the cylindrical socket. The sleeve supports the measuring coil 11*c* which is embedded therein. The measuring coil 11*c* is connected to modulating coil 12*c* by means of leads 76 and 77. The lead 77 extends through a well 78 formed in the block 71. A heating element 79, which may comprise a resistor, is also disposed in the well. The wire passes closely adjacent thereto. By passing current through the resistor via the leads 81 and 82 which may extend upwardly as indicated and through the plate 63, the resistor is heated. This normalizes the adjacent portion of the wire 77 and intercepts any persistent currents in the superconductive loop which includes the serially connected coils 11*c* and 12*c*. The coil 12*c* is disposed in a second well 86. A superconducting post 87 having its lower end in thermal contact with a low temperature sink 88 is disposed coaxially within the coil. The upper end of the post may contain a resistive film 89 having spaced contacts 91 and 92 connected to lead wires 93 and 94. By connecting the wires 93 and 94 to a source of current, the resistive film 89 is heated to heat the upper end of the post 87 to normalize the post as previously described with reference to FIGURE 9. This changes the inductance of the coil 12*c*. A pickup coil 22*c* surrounds the modulating coil and is provided with a pair of leads 96 and 97 for application of the output signal to associated amplifiers and/or measuring circuits. For the most sensitive measurements, the amplifier will be at liquid helium temperature.

In setting up the apparatus for a low temperature test, the outer annular space is filled with liquid nitrogen. Subsequently, the air is withdrawn from inside the Dewar flask 62 as, for example, by evacuating through the tube 68. The flask is then filled with helium gas which provides heat exchange to cool the various parts within the flask. Liquid helium is then added, and the pressure is lowered until the temperature of the liquid helium in the flask reaches the critical temperature for the parts.

In order to minimize radiation and heat transfer upwardly towards the plate 63, there is provided a plurality of spaced disc-like shields 98.

The sample is then inserted down in the tube 69 adjacent the measuring coil 11*c*. If the sample is also to be maintained at liquid helium bath temperature, then helium gas is placed within the tube to thereby provide heat exchange between helium and the sample.

In certain instances where it is desirable to measure at room temperature, a Dewar flask is substituted for the tube 69 whereby the temperature difference may be maintained.

In certain tests as, for example, in checking susceptibility of samples and in nuclear magnetic resonance tests, the sample is often subjected to relatively high constant magnetic fields. For this purpose, equipment such as that illustrated in FIGURES 12, 13 and 14 may be employed. Like reference numerals are applied to parts similar to those discussed with reference to F IGURES 10 and 11. Thus, the Dewar flasks 61 and 62 have the same reference numerals, and it is to be understood that these flasks are supported in a manner similar to that just described.

A superconducting magnet is employed to set up the high magnetic fields in which the sample 101 is disposed. The superconducting magnet includes a coil 102 shorted by lead 103 which passes adjacent to a heating member 104. Power leads 106 and 107 are connected to opposite ends of the coil. After the temperature of the coil has been lowered below its critical temperature and the metal is made superconducting, the heater 104 is energized to render the adjacent wire 103 normal whereby the same serves to present a relatively high resistance between the leads 106 and 107. Thus, application of a voltage to the leads will find a very low resistance in the coil 102 and induce relatively high currents in the coil 102. Subsequently, the resistor is deenergized to revert to low temperature and the power is removed from the leads. The currents in the coil will persist and flow in the coil to maintain a relatively high magnetic field. Disposed adjacent the innner Dewar flask 108 is the measuring coil 11*b* which is suitably connected by leads 111 and 112 to a modulating coil 113. A heater 114 is located adjacent a portion of one of the interconnecting leads to render the same normal for interrupting any persistent currents. The coil 113 may be modulated by any of the methods previously described and modulating means are not illustrated in this figure to simplify the figure. Likewise, for simplicity, the shield around heater 114 is not shown.

In order to prevent any of the high magnetic fields in the coil 102 from disturbing the remainder of the apparatus and particularly coil 113, there is provided surrounding the coil an inner soft iron shield 121 which serves to contain most of the fields. Any fields extending beyond this shield are then interrupted by a superconducting shield 122 which sees only fields below its critical value due to the inner shield 121. The superconducting shield 122 also protects and shields the circuit from external magnetic fields whereby the field provided by the superconducting magnet remains substantially constant.

The modulating coil is also shielded by a double shield including an outer soft iron shield and an inner superconducting shield 123 and 124, respectively. A sample 101 to be analyzed is then inserted down into the coil and any change in field will induce persistent currents which can be measured in the manner previously described. The sample 101 may, for example, be a biological sample such as DNA which must be maintained at a normal temperature. The inside Dewar flask 108 provides the normal temperature. Furthermore, it is often desired to measure the susceptibility of such a sample at relatively high magnetic fields and this is provided by the superconducting magnet 102.

Referring to FIGURE 15, there is shown apparatus similar to that of FIGURES 12, 13 and 14. A sample 131 is disposed within a resonant cavity 132 which is fed from a wave guide 133. Thus, the sample is placed within the resonant cavity and suitably supported thereon. It is then energized by microwave energy which can saturate the electron or nuclear spin at their resonant frequency. As the frequency is changed to the electron or nuclear resonance frequency, spin flip will occur, at which time there will be an absorption of the electromagnetic energy. This has, in the past, been detected by observing the absorption of the energy. However, in accordance with this invention, the spin flip is easily detected as a change in magnetic field. It is to be observed that only the change is measured since after the sample is inserted, the persistent currents may be interrupted. Then, any persistent currents which flow are due entirely to the flip of the electrons. If, after the flip, a portion of the interconnecting leads are again normalized and subsequently the frequency of the microwave field is reduced below resonance, there will be a counter flip which again will give rise to a current. This procedure can be followed using any technique which changes the magnetization of the sample such as optical absorption, temperature changes, etc.

The systems just described can measure susceptibility with high sensitivity. The sensitivity of the system is indicated by the following calculation:

Assume zero current in the superconductive loop and that the measuring coil is in a constant field of 10,000 gauss. When a sample is placed on the coil, a persistent current flows. Another method of inducing the current is to place a sample in coupled relationship to the measuring loop and then interrupt the persistent current. Then excite the sample with a microwave signal until it is saturated to flip the electron spins.

If the magnetization of the sample is M, the field in the sample is given by $$B=H+4\pi\frac{M}{V} \tag{10}$$

where H is the external field in which the sample is placed and V is the volume of the sample.

For electron spins $$M=N\mu\left(\frac{\mu H}{kT_s}\right) \tag{11}$$

where $\mu$ is the magnetic moment of electrons; N the number of unpaired electrons; and $T_s$ the absolute temperature of the sample.

If M is destroyed by a microwave field, that is, the spin system is saturated $$d\phi=AdB=A\left(4\pi\frac{M}{V}\right) \tag{12}$$

where A is the area of the sample $$\text{If } L_1=L_2 \text{ then } \phi_1=\tfrac{1}{2}d\phi \tag{13}$$

When this is modulated at frequency $f$ by an amount $\Delta L/L$, then the signal power in $L_1$ (coil 11) is $$\tfrac{1}{2}\left(\frac{\Delta L}{L}\right)^2\frac{\phi 1^2}{8\pi A^2}Vf \tag{14}$$

This should be equal to or greater than the noise $$kT\Delta f$$

Substituting in Equation 14 the following $$\phi_1^2=\tfrac{1}{4}A^2(4\pi)^2\frac{N^2\mu^2}{V^2}\left(\frac{\mu H}{kT_s}\right)^2 \tag{15}$$

and setting the expression equal to the noise figure and solving for N gives $$N^2=kT\left(\frac{\Delta f}{T}\right)\left(\frac{L}{\Delta L}\right)^2\frac{4}{\pi\mu^2}\left(\frac{kT_s}{\mu H}\right)^2V \tag{16}$$

If $T_s=2°k$; $\Delta f=0.1$; $f=10^7$; $\Delta L/L=0.1$ $$T=4°K,\ \mu=10^{-20},\ H-10^4 \text{ gauss},\ V=10^{-2} \text{ CC} \tag{16}$$

solving for N gives $$N\cong 2\times 10^8 \text{ electron spins} \tag{17}$$

which means the system is capable of detecting very low magnetic susceptibility.

Thus, there has been provided a system for measuring very small magnetic fields and very small susceptibility with a high degree of accuracy.

We claim:

1. The method of measuring small magnetic fields which comprises the steps of reducing the persistent currents in a superconductive loop substantially to zero, coupling the field to be measured into said loop to thereby induce in said loop a persistent current which is proportional to the magnetic field, and subsequently measuring said persistent current to give a measure of the magnetic field.

2. The method of measuring small magnetic fields which comprises the steps of coupling the magnetic field to be measured to a superconductive loop to thereby generate a change in persistent current in said loop which is proportional to the magnetic fields, modulating said persistent current to obtain an A-C current which has an amplitude which is proportional to the amplitude of said persistent current, inducing an E.M.F. in a circuit coupled to the loop responsive to said modulated current, and measuring the change in E.M.F to give a measure of the magnetic field which generates the change in persistent current.

3. The method of measuring small magnetic fields which comprises the steps of reducing the persistent current in a superconductive loop to a predetermined value, coupling the field to be measured to said loop to thereby give rise to a persistent current in said loop which is proportional to the magnetic field, modulating said persistent current to obtain an A-C current which has an amplitude which is proportional to the amplitude of said persistent current, and generating an E.M.F. in response to said modulated current to give a measure of the magnetic field.

4. The method of measuring small changes in magnetic fields which comprises the steps of coupling said field into a superconducting loop, reducing the persistent currents in said loop to a predetermined value, changing the field in said loop to induce persistent current in said loop which is proportional to the change in magnetic field, and measuring said change in persistent current to give a measure of the magnetic field.

5. The method as in claim 4 in which said persistent current is measured by modulating the current to obtain an A-C current which has an amplitude which is proportional to the amplitude of said persistent current inducing an E.M.F. in response to said change in current, and measuring the induced E.M.F. to give a measure of the magnetic field which induces the change in persistent current.

6. The method of measuring the difference in flux encircled by a first loop, connected in series with at least a second loop, from a quantized value $hc/2e$ which comprises reducing the current flowing serially through said first and second loops to zero, coupling the flux to be measured to the first loop while the current is zero, making the entire serially connected loops superconducting and then measuring the persistent current which flows in the serially connected loops by means associated with the second loop.

7. The method of absolutely measuring less than one quantum unit $hc/2e$ of flux encircled in the first loop of two serially connected loops comprising the steps of reducing the current flowing serially through said loops to zero, coupling the flux to be measured to the first loop while the current is zero, making the entire serially connected loops superconducting and then measuring the persistent current which flows in the serially connected loops by means associated with the second loop.

8. A system of the character described including a superconductive closed loop including first and second serially connected coils, each of said coils having at least one turn, means for coupling a magnetic field to be measured to said first coil, means associated with said second coil for cyclically modulating its inductance whereby to modulate the persistent currents flowing in said loop to obtain an A-C current having an amplitude proportional to the amplitude of the persistent current, and means responsive to the modulated current for generating an E.M.F. which is proportional to the amplitude of the modulated persistent current.

9. A system as in claim 8 including additionally means for normalizing a portion of said superconductive closed loop to thereby interrupt persistent currents flowing in the same.

10. A system as in claim 8 including additional means coupled to one of said coils for applying a magnetic field thereto to induce persistent currents in said loop.

11. A system as in claim 8 in which said means responsive to the modulated current for generating an E.M.F. comprises a pickup coil inductively coupled to one of said coils.

12. A system as in claim 8 in which said inductance modulating means comprises a superconductive member mounted for movement in and out of coupled relationship with respect to the second coil.

13. A system as in claim 8 wherein said means for modulating the inductance comprises a superconductive rod disposed in coupled relationship with respect to said second coil, and means for periodically normalizing said rod.

14. A system as in claim 8 wherein said inductance modulating means comprises a superconducting ground plane disposed in coupled relationship with respect to said second coil, and means for moving said ground plane with respect to said coil.

15. A system as in claim 14 in which said means for moving the superconducting ground plane comprises a mechanically resonant support.

16. A system as in claim 15 wherein said mechanically resonant support includes an electrically excited piezoelectric element.

17. A system as in claim 14 wherein said ground plane comprises a member having alternate normal and superconducting regions.

18. A system of the character described comprising a superconductive loop including first and second serially connected coils, each of said coils having at least one turn, first and second superconductive shields surrounding said first and second coils, means for disposing sample material within said shield in coupled relationship with said first coil, means associated with said second coil for modulating its inductance whereby to modulate persistent current flowing in said loop to obtain an A-C current having an amplitude proportional to the amplitude of the persistent current, and means responsive to the modulated current for generating an E.M.F. which is proportional to the amplitude of the modulated persistent current and indicative of the magnetic properties of the sample material.

19. A system as in claim 18 including additionally means disposed external of said shields for normalizing a portion of said superconductive loop.

20. A system as in claim 18 in which said inductance modulating means comprises a superconductive member mounted for movement in and out of coupled relationship with respect to the second coil.

21. A system as in claim 18 wherein said means for modulating the inductance comprises a superconductive rod disposed in coupled relationship with respect to said second coil, and means for periodically normalizing said rod.

22. A system as in claim 18 wherein said inductance modulating means comprises a superconducting ground plane disposed in coupled relationship with respect to said second coil, and means for moving said ground plane with respect to said coil.

23. A system as in claim 22 in which said means for moving the superconducting ground plane comprises a mechanically resonant support.

24. A system as in claim 23 wherein said mechanically resonant support includes an electrically excited piezoelectric element.

25. A system of the character described comprising a loop including first and second spaced serially connected coils, means for maintaining said loop at a temperature below the critical temperature whereby the loop becomes superconducting, means for coupling a magnetic field to be measured into said first loop, means for modulating the inductance of said second coil to modulate the persistent current in said loop to obtain an A-C current having an amplitude proportional to the amplitude of the persistent current, a pickup coil coupled to the second coil whereby there is induced in said pickup coil and E.M.F. which is proportional to the amplitude of the modulated persistent current flowing in said loop to thereby give a measure of the strength of the magnetic field.

26. A system as in claim 25 including means for interrupting the persistent current.

27. A system of the character described comprising a loop including first and second spaced serially connected coils, first and second shields surrounding said first and second coils, means for maintaining said loop and said shields below their critical temperature whereby the loop and shields become superconducting, means for introducing sample material into said first shield in coupled relationship with said first coil, a pickup coil disposed in coupled relationship with one of said coils, and means for modulating the inductance of the second coil to modulate persistent currents in said loop whereby to induce an E.M.F. proportional to the persistent current in said pickup coil and indicative of the magnetic properties of said sample material.

28. Apparatus as in claim 29 in which said means for introducing the sample material comprises a resonant cavity and means for exciting said resonant cavity with electromagnetic energy.

29. A system of the character described comprising a loop including first and second spaced serially connected coils, first and second shields surrounding said first and second coils, means for maintaining said loop and said shields below their critical temperature whereby the loop and shields become superconducting, a superconducting magnet disposed in said first shield, means for introducing sample material into said first shield in coupled relationship with said first coil, a pickup coil disposed in coupled relatonship with one of said coils, and means for modulating the inductance of the second coil to modulate persistent currents in said loop whereby to induce an E.M.F. proportional to the persistent current in said pickup coil.

References Cited

UNITED STATES PATENTS 3,320,522 5/1967 Arnold ____________ 324—43

OTHER REFERENCES

Deaver, Jr., et al.: Experimental Evidence for Quantized Flux in Superconducting Cylinders, Physical Review Letters, July 15, 1961, vol. 7, No. 2, pp. 43–46 (Copy in 324–43.)

RUDOLPH V. ROLINEC, *Primary Examiner.*

R. J. CORCORAN, *Assistant Examiner.*

U.S. Cl. X.R.

307—212, 245, 306; 324—43; 332—51; 335—216; 340—173.1